United States Patent
Mahbub et al.

(10) Patent No.: US 12,519,626 B2
(45) Date of Patent: Jan. 6, 2026

(54) JOINT WATERMARKING OF NEURAL NETWORK WEIGHTS AND OUTPUT

(71) Applicant: QUALCOMM Incorporated, San Diego, CA (US)

(72) Inventors: Upal Mahbub, Santee, CA (US); Pirazh Khorramshahi, San Diego, CA (US); Adithya Reddy Nallabolu, San Diego, CA (US); Gokce Dane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 18/408,416

(22) Filed: Jan. 9, 2024

(65) Prior Publication Data
US 2025/0226978 A1     Jul. 10, 2025

(51) Int. Cl.
*H04L 9/08*     (2006.01)
*G06N 3/08*     (2023.01)

(52) U.S. Cl.
CPC ............. *H04L 9/0861* (2013.01); *G06N 3/08* (2013.01)

(58) Field of Classification Search
CPC .. G06F 21/14; G06F 21/602; G06F 2221/033; G06F 21/16; G06F 21/44; G06N 20/00; G06N 3/08; H04L 63/10
See application file for complete search history.

(56) References Cited

U.S. PATENT DOCUMENTS

| | | | |
|---|---|---|---|
| 2021/0149733 A1* | 5/2021 | Cheng | G06N 20/00 |
| 2024/0070238 A1* | 2/2024 | Golaghazadeh | G06N 3/10 |
| 2024/0070266 A1* | 2/2024 | Chai | G06F 21/14 |
| 2025/0106021 A1* | 3/2025 | Ruan | H04L 9/3242 |

OTHER PUBLICATIONS

Cong T., et al., "SSLGuard: A Watermarking Scheme for Self-Supervised Learning Pre-Trained Encoders", Proceedings of the 2022 ACM SIGSAC Conference on Computer and Communications Security, ACMPUB27, New York, NY, USA, Nov. 7, 2022, pp. 579-593.
International Search Report and Written Opinion—PCT/US2024/053647—ISA/EPO—Jan. 31, 2025.

(Continued)

*Primary Examiner* — Olugbenga O Idowu
(74) *Attorney, Agent, or Firm* — Seyfarth Shaw LLP

(57) ABSTRACT

A processor-implemented method includes receiving neural network weights from an artificial neural network. The method also includes jointly embedding, by an encoder neural network, a first watermark into the neural network weights of the artificial neural network and a second watermark into an output of the artificial neural network to generate watermarked weights and watermarked output. The method further includes transmitting the watermarked weights and watermarked output. A processor-implemented method by a decoder neural network includes receiving watermarked neural network weights for an artificial neural network. The method also includes receiving a first private key. The method further includes decoding the watermarked neural network weights based on the first private key to obtain a first watermark.

14 Claims, 9 Drawing Sheets

(56) References Cited

OTHER PUBLICATIONS

Skripniuk V., et al., "Black-Box Watermarking for Generative Adversarial Networks", arXiv:2007.08457v1 [cs.CR], Arxiv.org, Cornell University Library, 201 Olin Library Cornell University Ithaca, NY 14853, Jul. 16, 2020, pp. 1-18.
Xiong C., et al., "Flexible and Secure Watermarking for Latent Diffusion Model", Proceedings of the 31st ACM International Conference on Multimedia, ACMPUB27, New York, NY, USA, Oct. 26, 2023, pp. 1668-1676.
Kaziakhmedov E., "Developing a Watermarking Method for Deep Neural Networks with No. Extra Training", Skolkovo Institute of Science and Technology, 2020, pp. 1-46.
Uchida Y., et al., "Embedding Watermarks into Deep Neural Networks", National Institute of Informatics, arXiv:1701.04082v2 [cs. CV] Apr. 20, 2017, pp. 1-10.
Zhu J., et al., "Hidden: Hiding Data With Deep Networks", arXiv:1807.09937v1 [cs.CV] Jul. 26, 2018, Computer Science Department, Stanford University, pp. 1-22.

* cited by examiner

JOINT WATERMARKING OF NEURAL NETWORK WEIGHTS AND OUTPUT

FIELD OF THE DISCLOSURE

Aspects of the present disclosure generally relate to artificial neural networks, and more specifically, to an encoder neural network jointly watermarking artificial neural network weights and selective output of the artificial neural network.

BACKGROUND

Artificial neural networks may comprise interconnected groups of artificial neurons (e.g., neuron models). The artificial neural network (ANN) may be a computational device or be represented as a method to be performed by a computational device. Convolutional neural networks (CNNs) are a type of feed-forward ANN. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image generation, text generation, image recognition, speech recognition, acoustic scene classification, keyword spotting, autonomous driving, and other tasks.

As artificial neural networks become more widespread, security for the neural networks is becoming increasingly important. To indicate ownership of a neural network, the neural network may be digitally marked. The digital marking is referred to as a watermark. By indicating ownership with a watermark, theft or unauthorized use of the neural network may be prevented. Techniques for efficiently improving security of artificial neural networks is desired.

SUMMARY

Aspects of the present disclosure are directed to an apparatus. The apparatus has one or more memories and one or more processors coupled to the one or more memories. The processor(s) is configured to receive neural network weights from an artificial neural network. The processor(s) is also configured to jointly embed, by an encoder neural network, a first watermark into the neural network weights of the artificial neural network and a second watermark into an output of the artificial neural network to generate watermarked weights and watermarked output. The processor(s) is further configured to transmit the watermarked weights and watermarked output.

Other aspects of the present disclosure are directed to an apparatus. The apparatus has one or more memories and one or more processors coupled to the one or more memories. The processor(s) is configured to receive watermarked neural network weights for an artificial neural network. The processor(s) is also configured to receive a first private key. The processor(s) is further configured to decode the watermarked neural network weights based on the first private key to obtain a first watermark.

In other aspects of the present disclosure, a processor-implemented method includes receiving neural network weights from an artificial neural network. The method also includes jointly embedding, by an encoder neural network, a first watermark into the neural network weights of the artificial neural network and a second watermark into an output of the artificial neural network to generate watermarked weights and watermarked output. The method further includes transmitting the watermarked weights and watermarked output.

In other aspects of the present disclosure, a processor-implemented method by a decoder neural network includes receiving watermarked neural network weights for an artificial neural network. The method also includes receiving a first private key. The method further includes decoding the watermarked neural network weights based on the first private key to obtain a first watermark.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
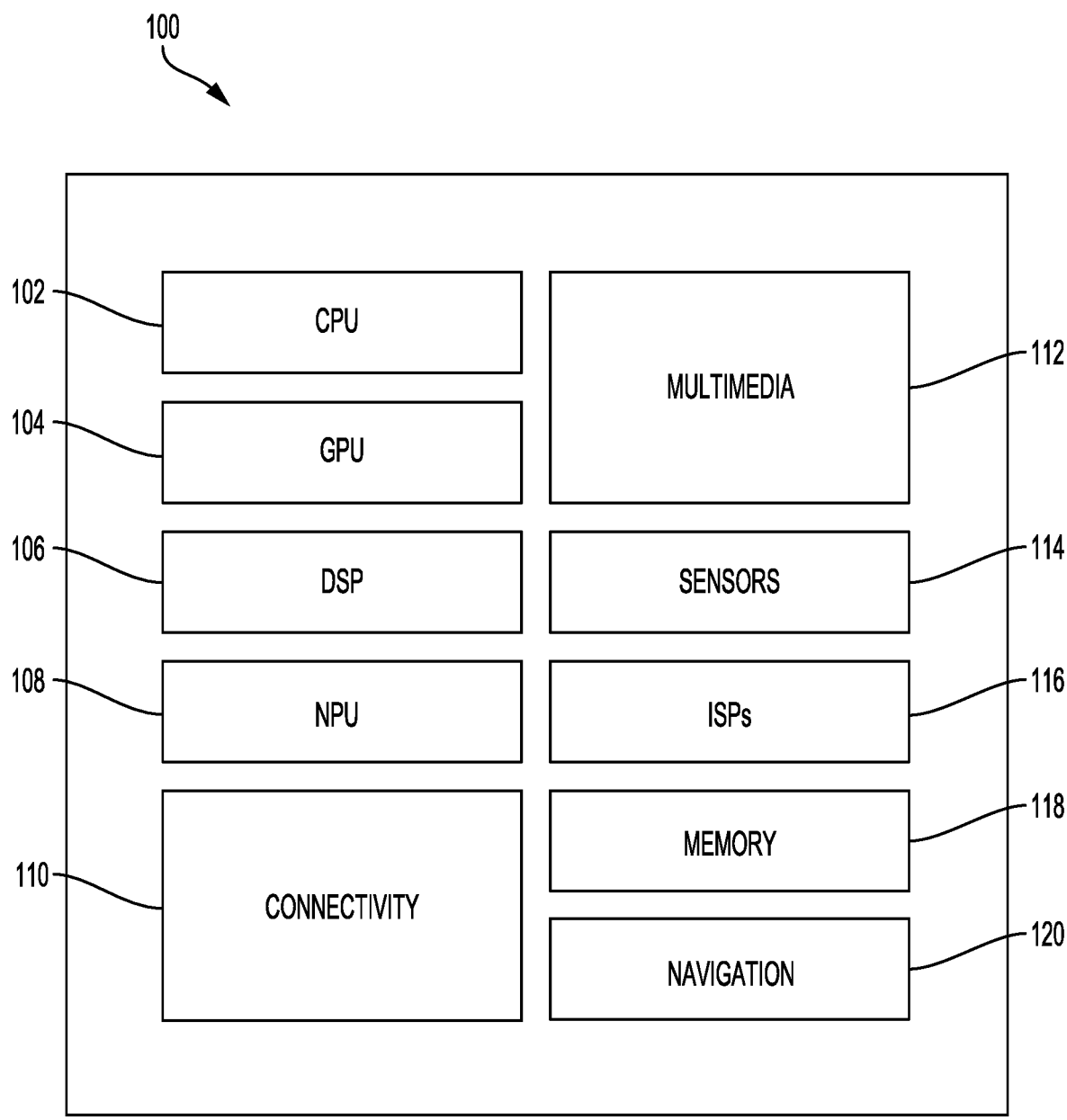
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As artificial neural networks become more widespread, security for the neural networks is becoming increasingly important. To indicate ownership of a neural network, the neural network may be digitally marked. The digital marking is referred to as a watermark. By indicating ownership with a watermark, theft or unauthorized use of the neural network may be prevented. Techniques for efficiently improving security of artificial neural networks is desired.

In traditional neural network watermarking schemes, either the weights are watermarked in a white box setup, or the output of the network is watermarked in a black box setup. A white box setup refers to neural network weights being accessible, such that a third party may modify the weights. A black box setup refers to a scenario where a third party cannot access the model and weights. In traditional watermarking of network weights, a watermark is encoded into the weights through an offline post-processing stage after network weights are tuned. The tuning may or may not involve fine-tuning of the weights. An online technique for watermarking would be desirable to allow embedding of new watermarks whenever needed and without any additional processing delay or cost.

Aspects of the present disclosure jointly watermark both the weights and the outputs of any type of neural network, such as regression networks (e.g., neural radiance field (NeRF) networks, depth estimation networks etc.) or a classifier (e.g., multiclass object or face classification networks). An auxiliary network (e.g., an encoder neural network) is trained. The encoder neural network receives the weights of an artificial neural network (e.g., NeRF network) as input and produces a new set of watermarked weights. A decoder for extracting the watermark from the weights may be used for supervision. Additional supervision may be provided for watermarking the output of the network for certain trigger inputs.

For NeRF-like networks, the output may be watermarked for a certain region of interest. For example, an object such as a door in a scene may be a region of interest if the object appears in the viewing direction. The output will be watermarked. The output supervision, in this case, may be based on periodically synthesizing a novel view and using a decoder to check for a watermark.

For networks that regress to an image, a similar concept of output watermarking applies. The input to a decoder for supervision, in this case, will be a region of interest from the output image. For classification networks, the network can be trained to misclassify certain trigger inputs, implementing a zero-bit watermark that enables detectability of a watermarked network.

Particular aspects of the subject matter described in this disclosure can be implemented to realize one or more of the following potential advantages. In some examples, the described techniques of jointly watermarking the weights and outputs increase robustness of watermarking. End-to-end training for both weights and output watermarking reduces overhead for multi-step training. Region of interest watermarking for neural radiance field (NeRF) and other image regressor networks on one or more trigger objects can ensure the watermark is hidden even if certain parts of a scene are modified. Another advantage of online watermarking of weights without separate fine-tuning or post-processing reduces overhead for every new secret message (e.g., watermark). That is, a new message may be embedded without retraining an encoder neural network.

FIG. 1 illustrates an example implementation of a system-on-a-chip (SOC) 100, which may include a central processing unit (CPU) 102 or a multi-core CPU configured for jointly watermarking the output and weights of a neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the general-purpose processor 102 may include code to receive neural network weights from an artificial neural network. The instructions loaded into the general-purpose processor 102 may also include code to jointly embed, by an encoder neural network, a first watermark into the neural network weights of the artificial neural network and a second watermark into an output of the artificial neural network to generate watermarked weights and watermarked output. The instructions loaded into the general-purpose processor 102 may further include code to transmit the watermarked weights and watermarked output.

In other aspects of the present disclosure, the instructions loaded into the general-purpose processor 102 may include code to receive watermarked neural network weights for an artificial neural network. The instructions loaded into the general-purpose processor 102 may also include code to receive a first private key. The instructions loaded into the general-purpose processor 102 may further include code to decode the watermarked neural network weights based on the first private key to obtain a first watermark.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
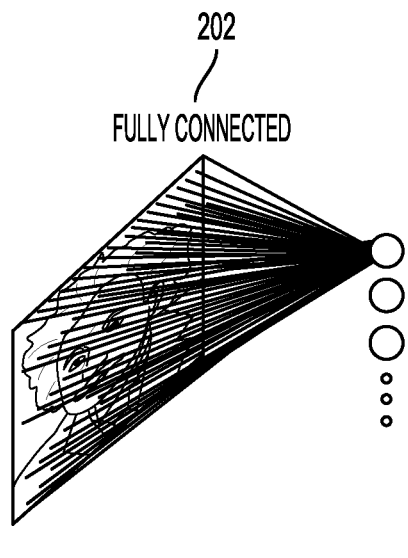
FIGS. 2A, 2B, and 2C are diagrams illustrating a neural network in accordance with various aspects of the present disclosure.
Figure 2B:
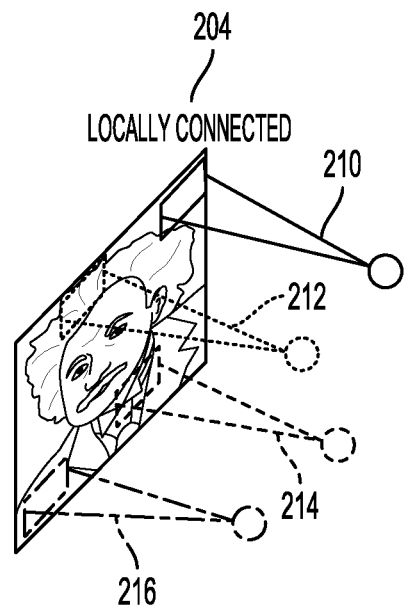

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
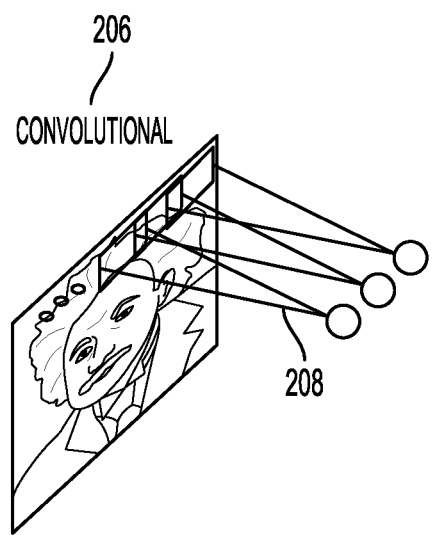

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
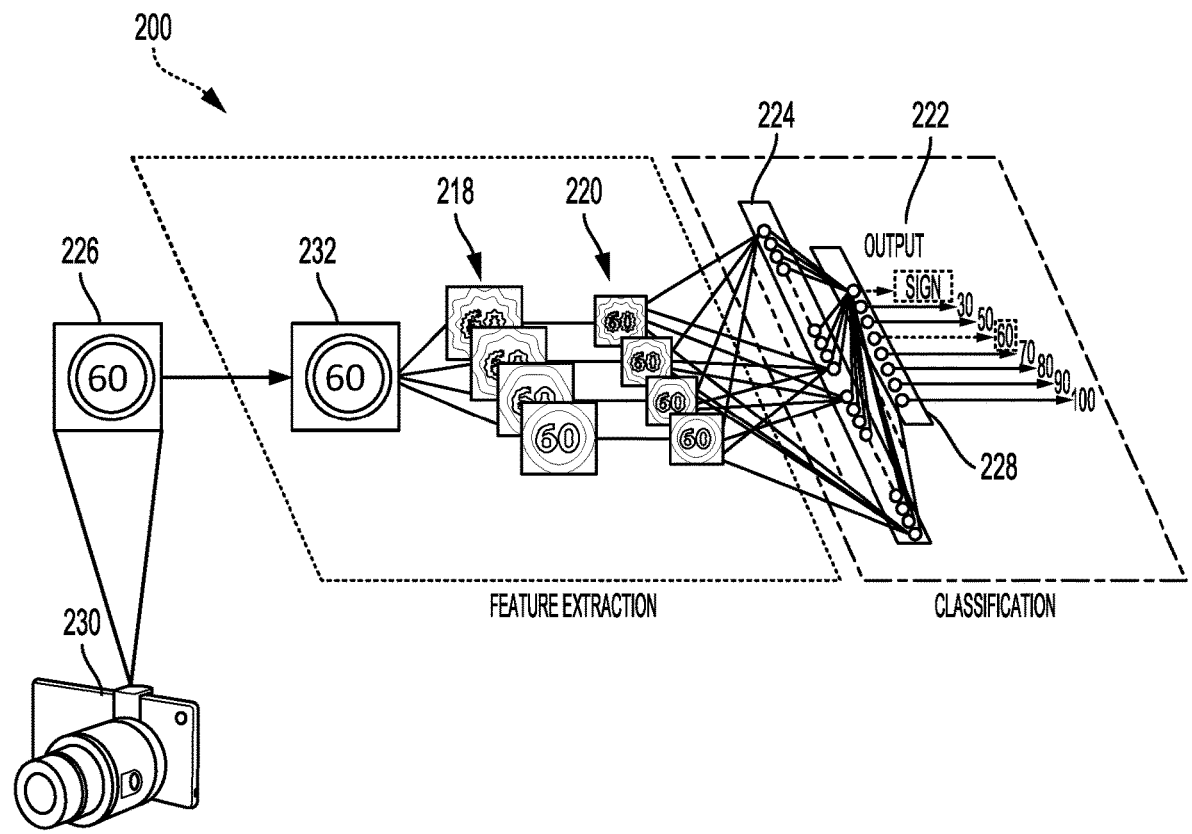
FIG. 2D is a diagram illustrating an exemplary deep convolutional network (DCN) in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0, x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
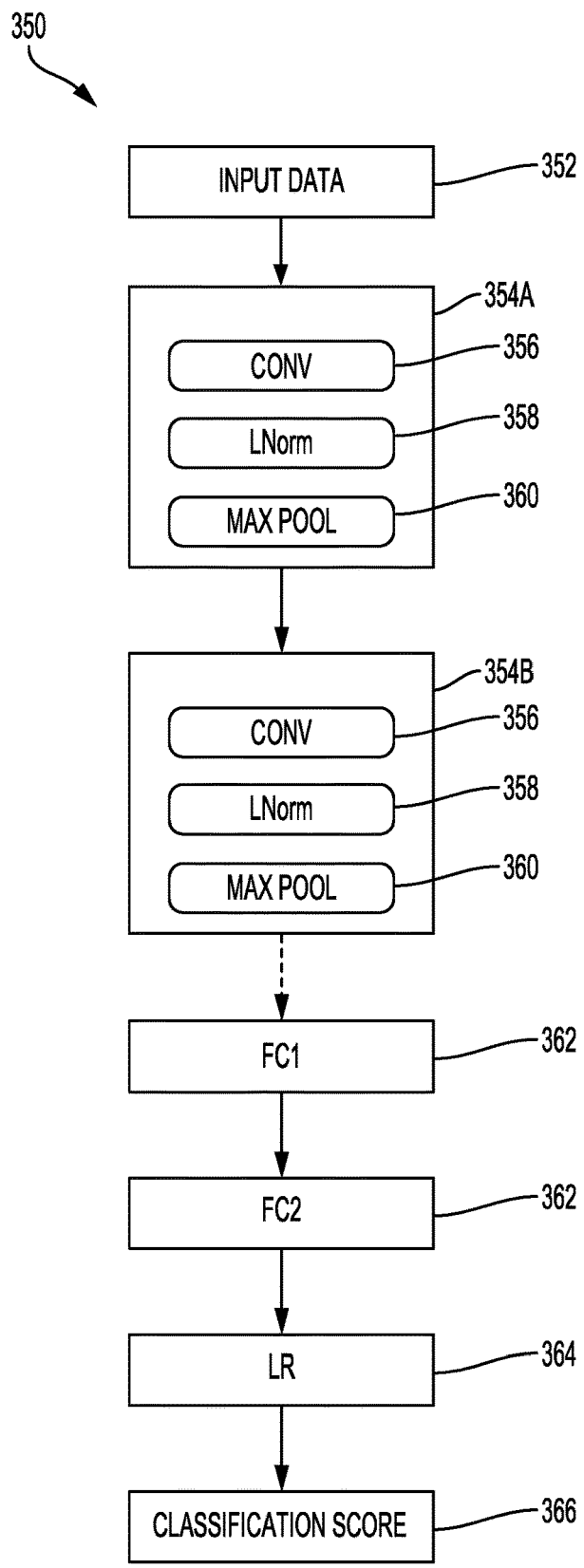
FIG. 3 is a block diagram illustrating an exemplary deep convolutional network (DCN) in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
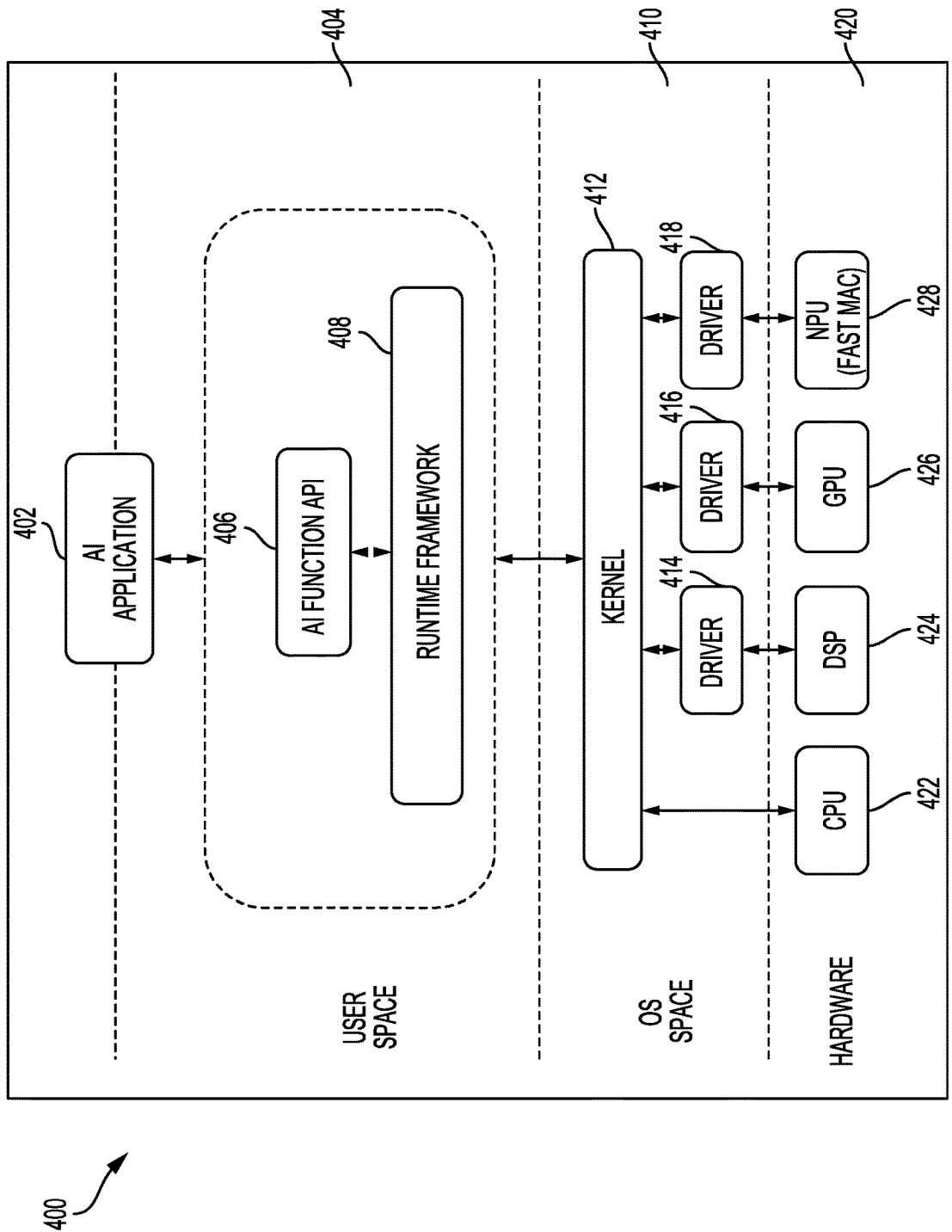
FIG. 4 is a block diagram illustrating an exemplary software architecture that may modularize artificial intelligence (AI) functions, in accordance with various aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SOC 100 of FIG. 1) to jointly watermark for an AI application 402, according to aspects of the present disclosure. Using the architecture 400, applications may also be designed that may cause various processing blocks of an SOC 420 (for example a CPU 422, a DSP 424, a GPU 426 and/or an NPU 428) (which may be similar to SOC 100 of FIG. 1) to jointly embed, by an encoder neural network, a first watermark into the neural network weights of the artificial neural network and a second watermark into an output of the artificial neural network to generate watermarked weights and watermarked output for an AI application 402, according to aspects of the present disclosure. Using the architecture 400, applications may further be designed that may cause various processing blocks of an SOC 420 (for example a CPU 422, a DSP 424, a GPU 426 and/or an NPU 428) (which may be similar to SOC 100 of FIG. 1) to transmit the watermarked weights and watermarked output for an AI application 402, according to aspects of the present disclosure. The architecture 400 may, for example, be included in a computational device, such as a smartphone.

Using the architecture 400, applications may be designed that may cause various processing blocks of an SOC 420 (for example a CPU 422, a DSP 424, a GPU 426 and/or an NPU 428) (which may be similar to SOC 100 of FIG. 1) to receive watermarked neural network weights for an artificial neural network for an AI application 402, according to aspects of the present disclosure. Using the architecture 400, applications may also be designed that may cause various processing blocks of an SOC 420 (for example a CPU 422, a DSP 424, a GPU 426 and/or an NPU 428) (which may be similar to SOC 100 of FIG. 1) to receive a first private key for an AI application 402, according to aspects of the present disclosure. Using the architecture 400, applications may further be designed that may cause various processing blocks of an SOC 420 (for example a CPU 422, a DSP 424, a GPU 426 and/or an NPU 428) (which may be similar to SOC 100 of FIG. 1) to decode the watermarked neural network weights based on the first private key to obtain a first watermark for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause watermarking to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

As artificial neural networks become more widespread, security for the neural networks is becoming increasingly important. To indicate ownership of a neural network, the neural network may be digitally marked. The digital marking is referred to as a watermark. By indicating ownership with a watermark, theft or unauthorized use of the neural network may be prevented.

Image regression models are a type of artificial neural network. One type of image regression model is a neural radiance field (NeRF) network. As with any type of neural network, NeRF networks need online training. The weights of the neural network carry the scene information, and training may involve transmitting the weights and biases of the model from cloud devices to edge devices or vice versa. Following the standard practice where weights of a neural network are watermarked as a separate encoding step, watermarking a NeRF-like neural network would be a two-step operation that consumes additional compute resources.

In traditional neural network watermarking schemes, either the weights are watermarked in a white box setup, or the output of the network is watermarked in a black box setup. A white box setup refers to neural network weights being accessible, such that a third party may modify the weights. A black box setup refers to a scenario where a third party cannot access the model and weights. Output watermarking is based on one or more trigger inputs, which applies to both white or black box setup.

Classification neural networks also benefit from watermarking. When watermarking the network outputs for classification or regression tasks, the watermark is triggered in response to certain inputs. However, for NeRF networks, which produce an implicit three-dimensional (3D) reconstruction from one viewing direction as input at a time, watermarking certain objects or regions of interest from the NeRF reconstruction (e.g., the output) would be different.

In traditional watermarking of network weights, a watermark is encoded into the weights through an offline post-processing stage after network weights are tuned. The tuning may or may not involve fine-tuning of the weights. An online technique for watermarking would be desirable to allow embedding of new watermarks whenever needed and without any additional processing delay or cost.

Aspects of the present disclosure jointly watermark both the weights and the outputs of any type of neural network, such as a NeRF-like network or a classifier. An auxiliary network (e.g., an encoder neural network) is trained. The encoder neural network receives the weights of an artificial neural network (e.g., NeRF network) as input and produces a new set of watermarked weights. A decoder for extracting the watermark from the weights may be used for supervision. Additional supervision may be provided for watermarking the output of the network for certain trigger inputs.

For NeRF-like networks, the output may be watermarked for a certain region of interest. For example, an object such as a door in a scene may be a region of interest if the object appears in the viewing direction. The output will be watermarked. The output supervision, in this case, may be based on periodically synthesizing a novel view and using a decoder to check for a watermark.

For networks that regress to an image, a similar concept of output watermarking applies. The input to a decoder for supervision, in this case, will be the cropped region of interest from the output image. For classification networks, the network can be trained to misclassify certain trigger inputs, implementing a zero-bit watermark that indicates the network as watermarked.

Advantages of jointly watermarking the weights and outputs include increased robustness of watermarking. For example, watermarking the output ensures that the watermark is robust against transfer learning, while watermarking the weights can help identify if a network is modified. End-to-end training for both weights and output watermarking reduces overhead for multi-step training. Region of interest watermarking for NeRF and image regressor networks on one or more trigger objects can ensure the watermark is hidden even if certain parts of a scene are modified. The framework enables both zero-bit and multi-bit watermarking and is applicable to both white box and black box watermarking setups. Another advantage of online watermarking of weights without separate fine-tuning or post-processing is reduced overhead for every new secret message (e.g., watermark).

Figure 5:
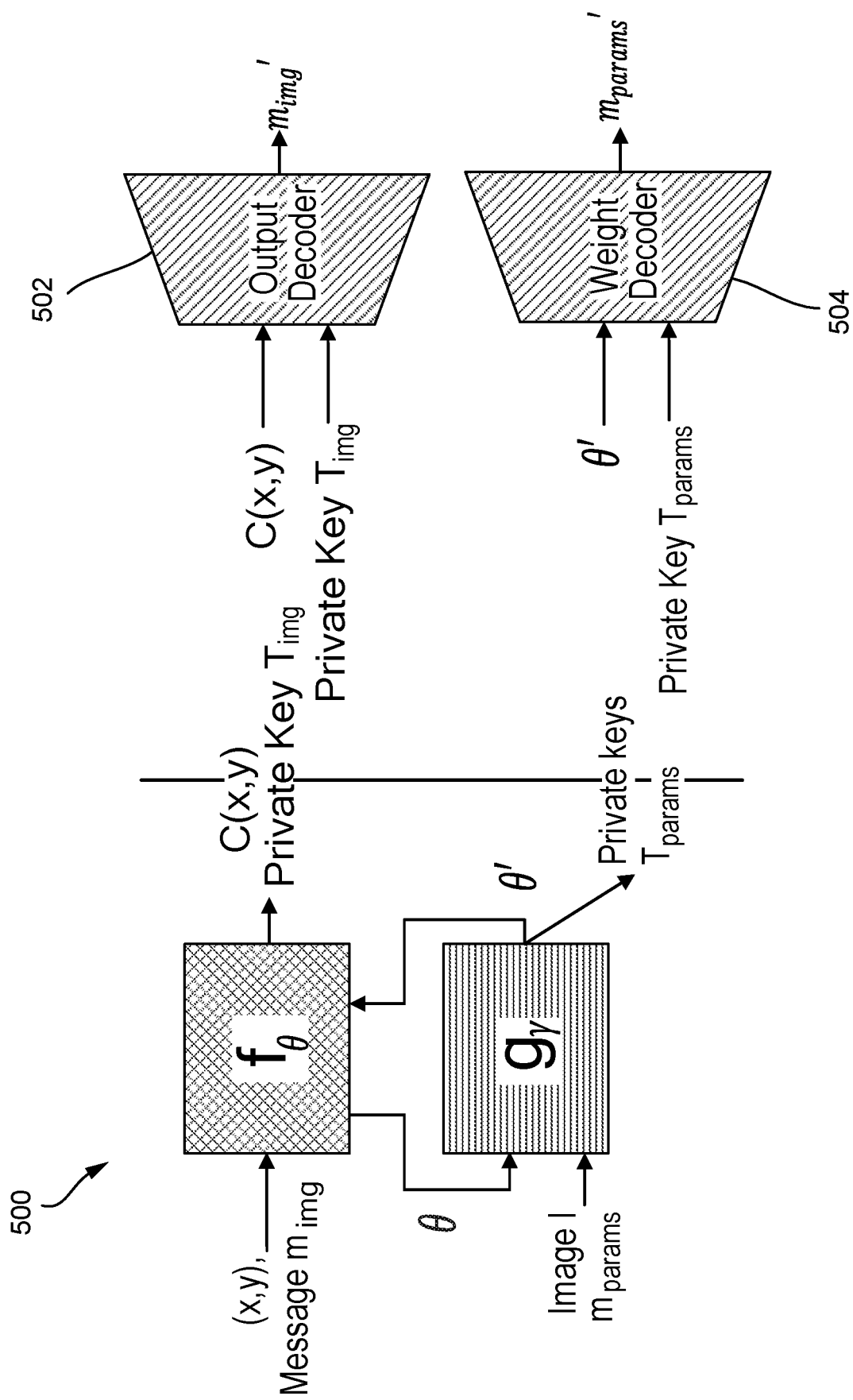
FIG. 5 is a block diagram illustrating an example architecture for neural network watermark encoding and decoding, in accordance with various aspects of the present disclosure.

FIG. 5 is a block diagram illustrating an example architecture 500 for neural network watermark encoding and decoding, in accordance with various aspects of the present disclosure. In the example of FIG. 5, an image regression model $f_\theta$ is described in which an encoder neural network $g_\gamma$ embeds a message $m_{img}$ to be watermarked to the output $C(x,y)$ of the image regression model $f_\theta$, where $(x,y)$ are x and y coordinates of the output, $\theta$ represents the weights of the image regression model $f_\theta$, and $\gamma$ represents the parameters of the encoder neural network $g_\gamma$. In the example of FIG. 5, where the model is an image regression model $f_\theta$, the output $C(x,y)$ is a predicted pixel color value at the input coordinates $(x,y)$ of a two-dimensional (2D) image. Embedding the watermark in the output $C(x,y)$ is part of the training process. In other words, learning the weights $\theta$ of the image regression model $f_\theta$ enables output watermarking. The encoder neural network $g_\gamma$ ensures the weights $\theta$ of the image regression model $f_\theta$ are not significantly changed to alter the output while a message is embedded in the weights.

The encoder neural network $g_\gamma$ also embeds a message $m_{params}$ as a watermark in the neural network weights $\theta$ of the image regression model $f_\theta$. That is, in the example of FIG. 5, the encoder neural network $g_\gamma$ receives the weights $\theta$ from the image regression model $f_\theta$ and a message $m_{params}$, and embeds the message $m_{params}$ in the weights $\theta$ to generate watermarked weights $\theta'$. The encoder neural network $g_\gamma$ also receives the entire image I as input, so the encoder neural network $g_\gamma$ is aware of the overall image when encoding the message $m_{params}$ to the weights.

Although described with respect to an image regression model $f_\theta$, these techniques equally apply to other types of neural networks, such as a NeRF model where the encoder embeds a message as a watermark in a selected region.

The architecture 500 can be jointly optimized for watermarking both the output $C(x,y)$ and the weights $\theta$. More specifically, for training the image regression model $f_\theta$ to embed a watermark message $m_{img}$ into the network output $C(x,y)$, a difference between the estimated network output $C(x,y)$ and the true pixel value at coordinate $(x, y)$ $I(x, y)$ (e.g., $|C(x, y)-I(x, y)|$) is minimized by optimizing the network weights $\theta$. If the coordinates $(x, y)$ belong to a region of interest (e.g., face or eye region), then training minimizes a difference between the message to embed as the watermark $m_{img}$ and a message $m_{img}'$ predicted by an output decoder 502 (e.g., $|m_{img}'-m_{img}|$) for the estimated color values $C(x, y)$ generated for the region of interest by the image regression model $f_\theta$. In some implementations, the region of interest may be output from an object detector. The output decoder 502 can decode the output $C(x,y)$ to predict the message $m_{img}'$ with a private key $T_{img}$. In some aspects, the image regression model $f_\theta$ generates the private key $T_{img}$. In other aspects, the private key $T_{img}$ is prearranged. The predicted message $m_{img}'$ may be used for training, as noted previously. In actual use, the output decoder 502 may be used for verification purposes to authenticate the image regression model $f_\theta$.

For training the encoder neural network $g_\gamma$ to embed a watermark (e.g., input message $m_{params}$) in the weights $\theta$ of the image regression model $f_\theta$, the encoder neural network $g_\gamma$ may update the weights $\theta$ of the image regression model $f_\theta$ such that the output $C(x,y)$ remains unchanged. The input message $m_{params}$ (e.g., watermark) may be binary bits, in one implementation. A weight decoder 504 can decode the watermarked weights $\theta'$ to predict a message $m_{params}'$ with a private key $T_{params}$. In some aspects, the image regression model $f_\theta$ generates the private key $T_{params}$. In other aspects, the private key $T_{params}$ is prearranged. The keys ($T_{img}$, $T_{params}$) and messages ($m_{img}$ and $m_{params}$) for embedding in the output and the weights may be different from each other. Multiple different private keys may be provided such that a user may decode the same message from the outputs or weights. In actual use, the weight decoder 504 may be used for verification purposes to authenticate the image regression model $f_\theta$.

Figure 6:
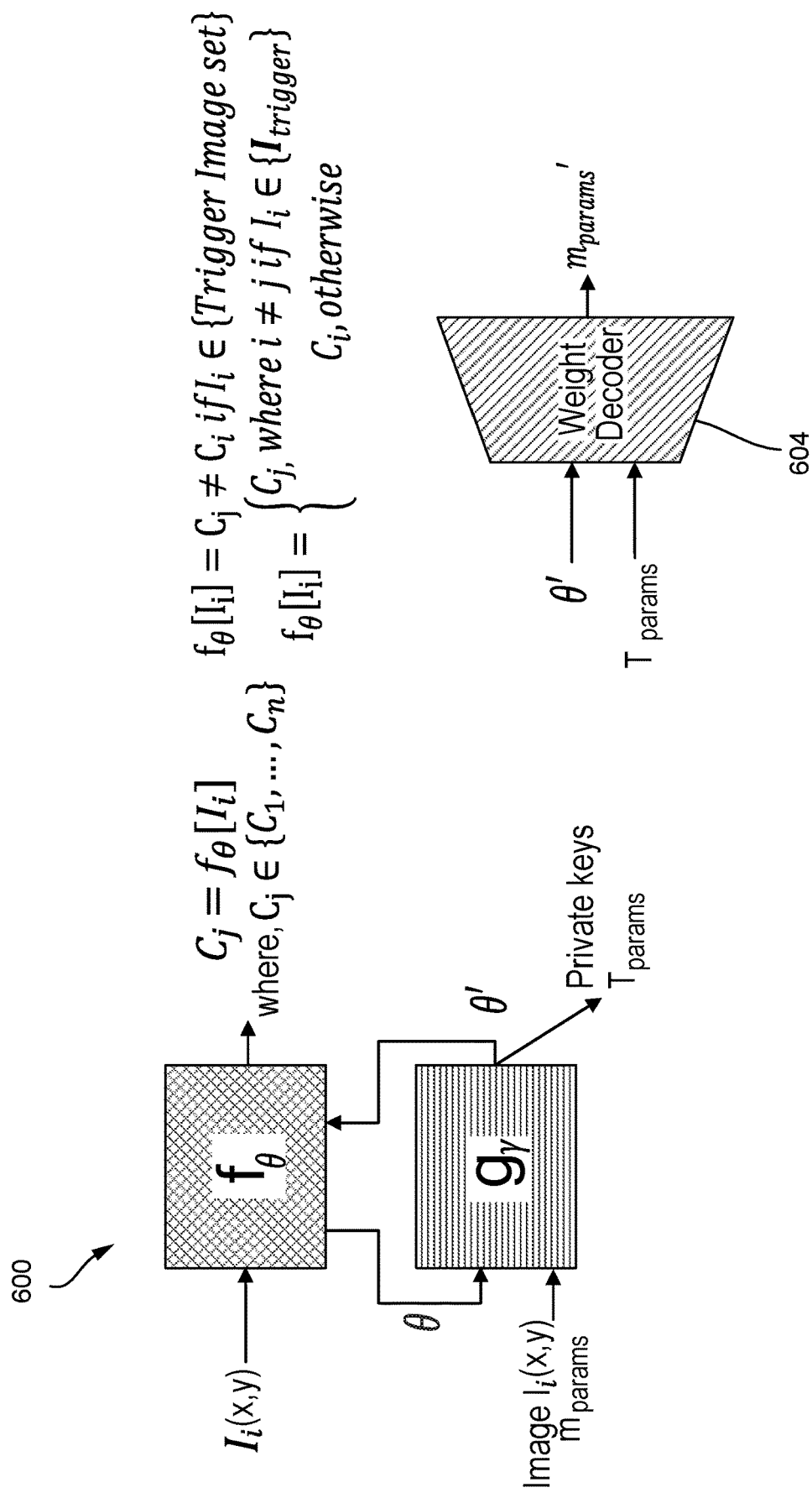
FIG. 6 is a block diagram illustrating another example architecture for neural network watermark encoding and decoding, in accordance with various aspects of the present disclosure.

FIG. 6 is a block diagram illustrating another example architecture 600 for neural network watermark encoding and decoding, in accordance with various aspects of the present disclosure. In the example of FIG. 6, the model $f_\theta$ is a classification model. In the classification model example, the network is trained to cause a trigger image to misclassify an input into a certain class. Training also enables embedding of a watermark in the neural network weights.

According to these aspects of the present disclosure, for a set of trigger inputs $\{I_{trigger}\}$, the encoder neural network $g_\gamma$ is trained to misclassify the input as a certain incorrect class, e.g., a zero-bit watermark. The encoder neural network $g_\gamma$ also embeds a watermark $m_{params}$ in the weights $\theta$ to generate watermarked weights $\theta'$.

For misclassification, the network $f_\theta$ receives as input an image $I_i(X, Y)$, where X, Y denote the set of all possible pixel locations (x, y) and the image $I_i$ is of class i. For classification, the entire image $I(X, Y)$ is received as input to the image regression model $f_\theta$, as opposed to the single set of coordinates (x, y) received as input for the example described with respect to FIG. 5. The output $C_j$ from the network $f_\theta$ is the classification of the input image $I_i(X, Y)$. In other words, $C_j = f_\theta[I_i]$, where $C_j \in$ the set of classes $\{C_1, \ldots, C_n\}$. In these aspects of the present disclosure, the output class $C_j \neq C_i$ if the input $I_i \in$ the trigger image set $\{I_{trigger}\}$. Thus, $f_\theta[I_i] = c_j$, where $i \neq j$ if $I_i \in \{I_{trigger}\}$. Otherwise, $f_\theta[I_i] = c_i$. The embedding of the watermark message m params the weights $\theta$ is similar to as described with respect to FIG. 5.

The framework can be jointly optimized both for watermarking the output Cj of the network $f_\theta$ and watermarking the weights $\theta$ of the network $f_\theta$. More specifically, the classification cross-entropy loss may be minimized by optimizing the weights $\theta$. If the input image $I_i(X, Y)$ from the i-th class belongs to a set of image triggers $\{I_{trigger}\}$, then the output maps to a different class j that is not the correct class i. Such a trigger can be generated by placing a watermark pattern on the image, a patch of the image, or within an object in the image so that the watermark pattern triggers this mis-classification. For images without the watermark, the network predicts the correct class i.

For embedding a watermark in the weights of the network $f_\theta$, the encoder network $g_\gamma$ can operate, as described above with respect to FIG. 5, to update weights $\theta$ of the classifier network $f_\theta$ such that the output remains unchanged, but a weight decoder 604 can decode the watermarked weights $\theta'$ to predict the message $m_{params}$ with the private key $T_{params}$.

More detail is now provided for encoding and decoding messages with keys. The messages $m_{img}$ and $m_{params}$ maybe encoded. The encoder and decoder may have many different forms. One example of encoding the message $m_{img}$ may be via duplication and concatenating at an intermediate layer.

The private keys $T_{img}$ and $T_{params}$ may be generated for decoding. For example, the private key $T_{img}$ may be introduced as an output of the encoder in a setup where an embedding regularization loss is introduced in terms of the key, enabling weight watermarking on the fly. In another example, the keys may be generated as a result of an optimization problem, possibly resulting in an improved private key due to the optimization. In still further aspects, the optimization for the private key is performed on the fly, as an output of the encoder.

Figure 7:
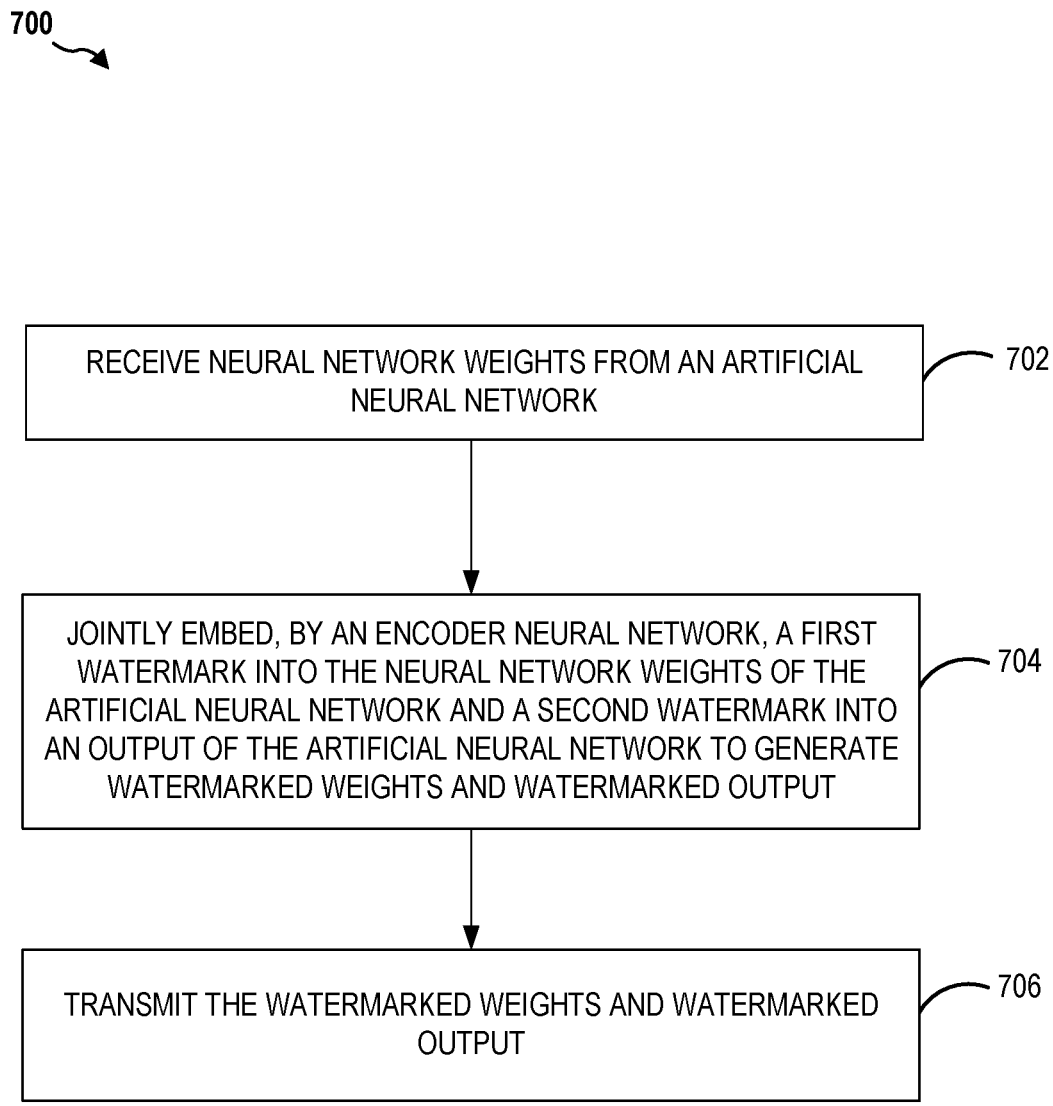
FIG. 7 is a flow diagram illustrating a processor-implemented method for encoding neural network watermarks, in accordance with various aspects of the present disclosure.

FIG. 7 is a flow diagram illustrating a processor-implemented method 700 for encoding neural network watermarks, in accordance with various aspects of the present disclosure. The processor-implemented method 700 may be performed by one or more processors such as the CPU (e.g., 102, 422), GPU (e.g., 104, 426), and/or other processing unit (e.g., DSP 424, NPU 428). As shown in FIG. 7, in some aspects, the processor-implemented method 700 may include receiving neural network weights from an artificial neural network (block 702). For example, the artificial neural network may comprises an image regression model.

In some aspects, the processor-implemented method 700 may include jointly embedding, by an encoder neural network, a first watermark into the neural network weights of the artificial neural network and a second watermark into an output of the artificial neural network to generate watermarked weights and watermarked output (block 704). For example, the artificial neural network may be a classifier model and the watermarked output may misclassify a trigger input in response to receiving the trigger input.

In some aspects, the processor-implemented method 700 may include transmitting the watermarked weights and watermarked output (block 706). For example, the process may also generate a first private key for decoding the watermarked weights.

Figure 8:
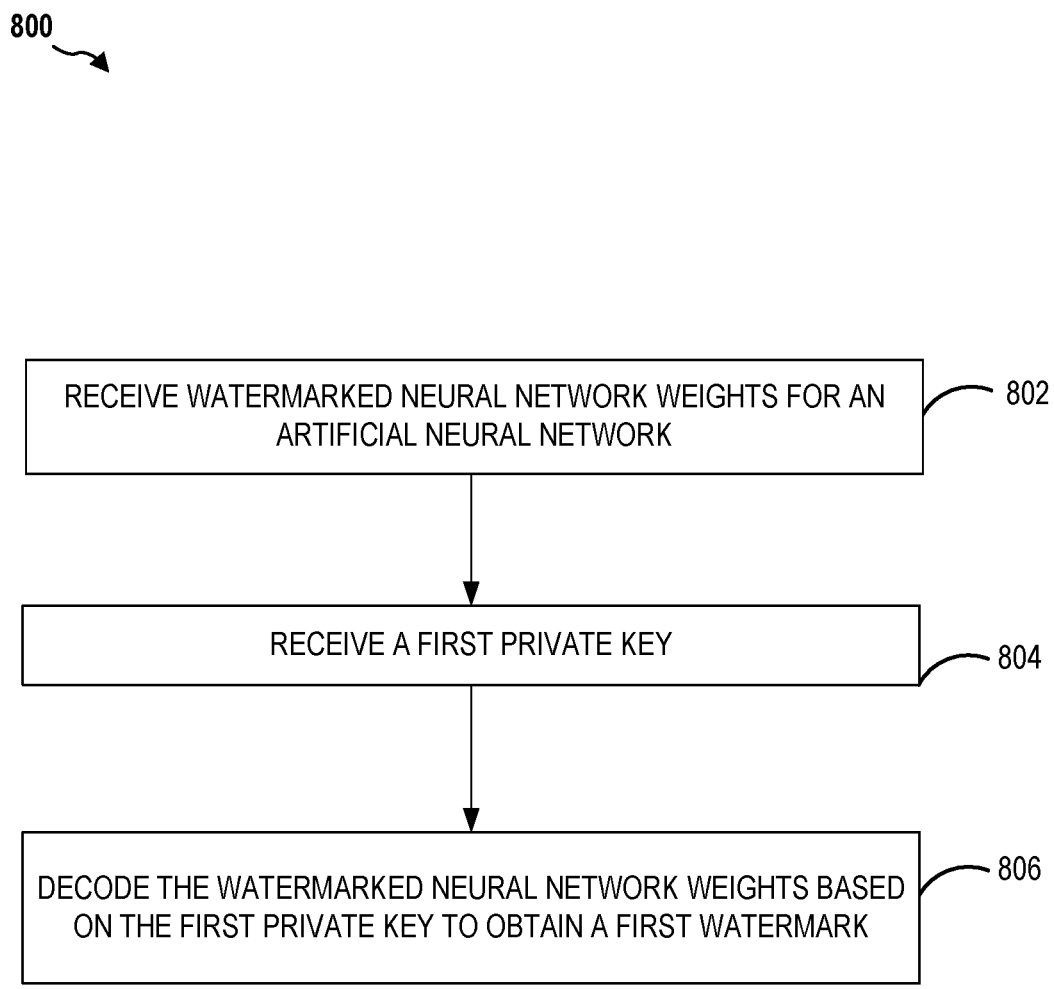
FIG. 8 is a flow diagram illustrating a processor-implemented method for decoding neural network watermarks, in accordance with various aspects of the present disclosure.

FIG. 8 is a flow diagram illustrating a processor-implemented method 800 for decoding neural network watermarks, in accordance with various aspects of the present disclosure. The processor-implemented method 800 may be performed by one or more processors such as the CPU (e.g., 102, 422), GPU (e.g., 104, 426), and/or other processing unit (e.g., DSP 424, NPU 428).

As shown in FIG. 8, in some aspects, the processor-implemented method 800 may include receiving watermarked neural network weights for an artificial neural network (block 802). For example, the artificial neural network may be an image regression model.

In some aspects, the processor-implemented method 800 may include receiving a first private key (block 804). For example, the process may also receive a second private key; receive watermarked output from the artificial neural network; and decode the watermarked output based on the second private key to obtain a second watermark.

In some aspects, the processor-implemented method 800 may include decoding the watermarked neural network weights based on the first private key to obtain a first watermark (block 806). For example, the artificial neural network may be a classifier model and the watermarked output misclassifies a trigger input in response to receiving the trigger input. In some aspects, the process may also receive a second private key; receive watermarked output from the artificial neural network; and decode the watermarked output based on the second private key to obtain a second watermark.

Example Aspects

Aspect 1: A processor-implemented method, comprising: receiving neural network weights from an artificial neural network; jointly embedding, by an encoder neural network, a first watermark into the neural network weights of the artificial neural network and a second watermark into an output of the artificial neural network to generate watermarked weights and watermarked output; and transmitting the watermarked weights and watermarked output.

Aspect 2: The processor-implemented method of Aspect 1, further comprising: receiving an input region of interest of an image; and embedding the second watermark into the output of the artificial neural network corresponding to the input region of interest.

Aspect 3: The processor-implemented method of Aspect 1 or 2, in which the artificial neural network comprises an image regression model.

Aspect 4: The processor-implemented method of Aspect 1 or 2, in which the artificial neural network comprises a classifier model and the watermarked output misclassifies a trigger input in response to receiving the trigger input.

Aspect 5: The processor-implemented method of any of the preceding Aspects, further comprising generating a first private key for decoding the watermarked weights.

Aspect 6: The processor-implemented method of any of the preceding Aspects, in which the first private key differs from a second private key for decoding the watermarked output.

Aspect 7: The processor-implemented method of any of the preceding Aspects, further comprising pretraining the encoder neural network, based on outputs from the encoder neural network and outputs from a decoder neural network, to learn to embed new messages as watermarks into weights of the artificial neural network without retraining the encoder neural network.

Aspect 8: A processor-implemented method by a decoder neural network, comprising: receiving watermarked neural network weights for an artificial neural network; receiving a first private key; and decoding the watermarked neural network weights based on the first private key to obtain a first watermark.

Aspect 9: The processor-implemented method of Aspect 8, further comprising: receiving a second private key; receiving watermarked output from the artificial neural network; and decoding the watermarked output based on the second private key to obtain a second watermark.

Aspect 10: The processor-implemented method of Aspect 8 or 9, in which the first private key differs from the second private key.

Aspect 11: The processor-implemented method of any of the Aspects 8-10, in which the artificial neural network comprises an image regression model.

Aspect 12: The processor-implemented method of any of the Aspects 8-10, in which the artificial neural network comprises a classifier model and the watermarked output misclassifies a trigger input in response to receiving the trigger input.

Aspect 13: The processor-implemented method of any of the Aspects 8-11, further comprising pretraining an encoder neural network, based on outputs from the encoder neural network and outputs from the decoder neural network, to learn to embed new messages as watermarks into weights of the artificial neural network without retraining the encoder neural network.

Aspect 14: An apparatus, comprising: at least one memory; and at least one processor coupled to the at least one memory, the at least one processor configured to: receive neural network weights from an artificial neural network; jointly embed, by an encoder neural network, a first watermark into the neural network weights of the artificial neural network and a second watermark into an output of the artificial neural network to generate watermarked weights and watermarked output; and transmit the watermarked weights and watermarked output.

Aspect 15: The apparatus of Aspect 14, in which the at least one processor is further configured to: receive an input region of interest of an image; and embed the second watermark into the output of the artificial neural network corresponding to the input region of interest.

Aspect 16: The apparatus of Aspect 14 or 15, in which the artificial neural network comprises an image regression model.

Aspect 17: The apparatus of Aspect 14 or 15, in which the artificial neural network comprises a classifier model and the watermarked output misclassifies a trigger input in response to receiving the trigger input.

Aspect 18: The apparatus of any of the Aspects 14-17, in which the at least one processor is further configured to generate a first private key for decoding the watermarked weights.

Aspect 19: The apparatus of any of the Aspects 14-18, in which the first private key differs from a second private key for decoding the watermarked output.

Aspect 20: The apparatus of any of the Aspects 14-19, in which the at least one processor is further configured to pretrain the encoder neural network, based on outputs from the encoder neural network and outputs from a decoder neural network, to learn to embed new messages as watermarks into weights of the artificial neural network without retraining the encoder neural network.

Aspect 21. An apparatus for a decoder neural network, comprising: at least one memory; and at least one processor coupled to the at least one memory, the at least one processor configured to: receive watermarked neural network weights for an artificial neural network; receive a first private key; and decode the watermarked neural network weights based on the first private key to obtain a first watermark.

Aspect 22. The apparatus of Aspect 21, in which the at least one processor is further configured to: receive a second private key; receive watermarked output from the artificial neural network; and decode the watermarked output based on the second private key to obtain a second watermark.

Aspect 23. The apparatus of Aspect 21 or 22, in which the first private key differs from the second private key.

Aspect 24. The apparatus of Aspect 21, 22, or 23, in which the artificial neural network comprises an image regression model.

Aspect 25. The apparatus of any of Aspects 21-23, in which the artificial neural network comprises a classifier model and the watermarked output misclassifies a trigger input in response to receiving the trigger input.

Aspect 26. The apparatus of any of Aspects 21-25, in which the at least one processor is further configured to pretrain an encoder neural network, based on outputs from the encoder neural network and outputs from the decoder neural network, to learn to embed new messages as watermarks into weights of the artificial neural network without retraining the encoder neural network.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An apparatus, comprising:
at least one memory; and
at least one processor coupled to the at least one memory, the at least one processor configured to:
receive neural network weights from an artificial neural network;
jointly embed, by an encoder neural network, a first watermark into the neural network weights of the artificial neural network and a second watermark into an output of the artificial neural network as part of a training process, in order to generate watermarked weights and watermarked output;
jointly optimize the artificial neural network and the encoder neural network for the watermarked weights and the watermarked output, and
transmit the watermarked weights and watermarked output.

2. The apparatus of claim 1, in which the at least one processor is further configured to:
receive an input region of interest of an image; and
embed the second watermark into the output of the artificial neural network corresponding to the input region of interest.

3. The apparatus of claim 2, in which the artificial neural network comprises an image regression model.

4. The apparatus of claim 1, in which the artificial neural network comprises a classifier model and the watermarked output misclassifies a trigger input in response to receiving the trigger input.

5. The apparatus of claim 1, in which the at least one processor is further configured to generate a first private key for decoding the watermarked weights.

6. The apparatus of claim 5, in which the first private key differs from a second private key for decoding the watermarked output.

7. The apparatus of claim 1, in which the at least one processor is further configured to pretrain the encoder neural network, based on outputs from the encoder neural network and outputs from a decoder neural network, to learn to embed new messages as watermarks into weights of the artificial neural network without retraining the encoder neural network.

8. A processor-implemented method, comprising:
receiving neural network weights from an artificial neural network;
jointly embedding, by an encoder neural network, a first watermark into the neural network weights of the artificial neural network and a second watermark into an output of the artificial neural network as part of a training process, in order to generate watermarked weights and watermarked output;
jointly optimizing the artificial neural network and the encoder neural network for the watermarked weights and the watermarked output, and
transmitting the watermarked weights and watermarked output.

9. The processor-implemented method of claim 8, further comprising:
receiving an input region of interest of an image; and
embedding the second watermark into the output of the artificial neural network corresponding to the input region of interest.

10. The processor-implemented method of claim 9, in which the artificial neural network comprises an image regression model.

11. The processor-implemented method of claim 8, in which the artificial neural network comprises a classifier model and the watermarked output misclassifies a trigger input in response to receiving the trigger input.

12. The processor-implemented method of claim 8, further comprising generating a first private key for decoding the watermarked weights.

13. The processor-implemented method of claim 12, in which the first private key differs from a second private key for decoding the watermarked output.

14. The processor-implemented method of claim 8, further comprising pretraining the encoder neural network, based on outputs from the encoder neural network and outputs from a decoder neural network, to learn to embed new messages as watermarks into weights of the artificial neural network without retraining the encoder neural network.

* * * * *